US009629065B2

(12) United States Patent
Turányi et al.

(10) Patent No.: US 9,629,065 B2
(45) Date of Patent: Apr. 18, 2017

(54) LOCAL ACCESS POINT NAME FOR USE IN ACCESSING PACKET DATA NETWORKS

(75) Inventors: Zoltán Richárd Turányi, Szentendre (HU); Dinand Roeland, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 594 days.

(21) Appl. No.: 14/113,484

(22) PCT Filed: Apr. 28, 2011

(86) PCT No.: PCT/EP2011/056769
§ 371 (c)(1),
(2), (4) Date: Dec. 4, 2013

(87) PCT Pub. No.: WO2012/146291
PCT Pub. Date: Nov. 1, 2012

(65) Prior Publication Data
US 2014/0078967 A1 Mar. 20, 2014

(51) Int. Cl.
*H04W 4/00* (2009.01)
*H04W 40/30* (2009.01)
*H04W 8/08* (2009.01)
*H04W 88/16* (2009.01)
*H04W 92/02* (2009.01)

(52) U.S. Cl.
CPC ......... *H04W 40/30* (2013.01); *H04W 8/082* (2013.01); *H04W 88/16* (2013.01); *H04W 92/02* (2013.01)

(58) Field of Classification Search
CPC ..... H04W 40/30; H04W 8/082; H04W 88/16; H04W 92/02

USPC ........................................................ 370/328
See application file for complete search history.

(56) References Cited

U.S. PATENT DOCUMENTS

| 2011/0075675 A1* | 3/2011 | Koodli | H04L 12/14 370/401 |
| 2012/0020260 A1* | 1/2012 | Chen | H04W 28/08 370/310 |
| 2014/0161026 A1* | 6/2014 | Stojanovski | H04L 45/22 370/328 |

OTHER PUBLICATIONS

"A new suggestion for WLAN Offload decision and indication", 3GPP TSG SA WG2 Meeting #79, May 10-14, 2010, ZTE.*

(Continued)

*Primary Examiner* — Peter Cheng
(74) *Attorney, Agent, or Firm* — Murphy, Bilak & Homiller, PLLC (57) ABSTRACT

One aspect provides a method of enabling a user entity, UE (10), to access a local Packet Data Network, PDN, when the UE (10) accesses an Evolved Packet Core, EPC, network via a Broadband Forum, BBF-defined access network over the S2a interface. The method includes receiving a request from the UE in the EPC (203, 204), the request including one or more Access Point Names, APNs. A decision (205) is made to offload at least one of the APNs by designating it as a local APN. Communications are established between the UE and a PDN identified by use of the designated local APN in a session set-up request from the UE. The communications are established directly (505), via the BBF-defined access network, and so as to avoid passing data packets via the EPC. Other aspects include an EPC network entity, a Broadband Network Gateway, BNG (22), in a BBF-defined access network (20), and User equipment (10) configured in accordance with the method.

13 Claims, 5 Drawing Sheets

(56) References Cited

OTHER PUBLICATIONS

"Way forward for the work", 3GPP/BFF Workshop on FMC, Feb. 18-19, 2010, FMC100021, Alcatel Lucent.*
Unknown, Author. "A New Suggestion for WLAN Offload Decision and Indication." ZTE. 3GPP TSG SA WG2 Meeting #79. TD S2-102378. May 10-14, 2010. Kyoto, Japan.
Unknown, Author. "Way Forward for the Work." Alcatel-Lucent. 3GPP/BBF Workshop on FMC. FMC100021. Feb. 18-19, 2010. San Francisco, USA.
Unknown, Author. "QoS for a 3GPP UE in BBF." Ericsson, ST-Ericsson. 3GPP TSG SA WG2 Meeting #80. TD SD-103647. Aug. 30-Sep. 3, 2010. Brunstad, Norway.
Unknown, Author. "3rd Generation Partnership Project; Technical Specification Group Services and System Aspects; Study on Support of BBF Access Interworking (Release 11)." 3GPP TR 23.839 V. 0.06.0. Apr. 2011.

* cited by examiner

LOCAL ACCESS POINT NAME FOR USE IN ACCESSING PACKET DATA NETWORKS

TECHNICAL FIELD

The present invention relates to a method in a telecommunications network for enhancing user access to packet data networks (PDNs), and to network entities or nodes configured for application of the method.

BACKGROUND

The Third Generation Project Partnership (3GPP) has developed the System Architecture Evolution (SAE) as the core network architecture of its future and Long Term Evolution (LTE) wireless mobile telecommunications standard. The main component of the SAE architecture is the Evolved Packet Core (EPC). The LTE/SAE network includes network entities supporting the user and control planes.

A Serving Gateway (SGW) routes and forwards user data packets and acts as an anchor for mobility between LTE and other 3GPP technologies. It also manages and stores User Equipment (UE) contexts, e.g. parameters of the IP bearer service and network internal routing information. A Public Data Network gateway (PDN-GW or PGW) provides connectivity from the UE to external PDNs by being the point of exit and entry of traffic for the UE. The PGW also performs policy enforcement and other functions and acts as the anchor for mobility between 3GPP and non-3GPP technologies. As used herein, the term UE is intended to refer to any piece of equipment that is configured to access the internet, and would include, for example and without limitation, mobile telecommunication devices, portable or hand-held computing devices and desktop or installed computers.

Figure 1:
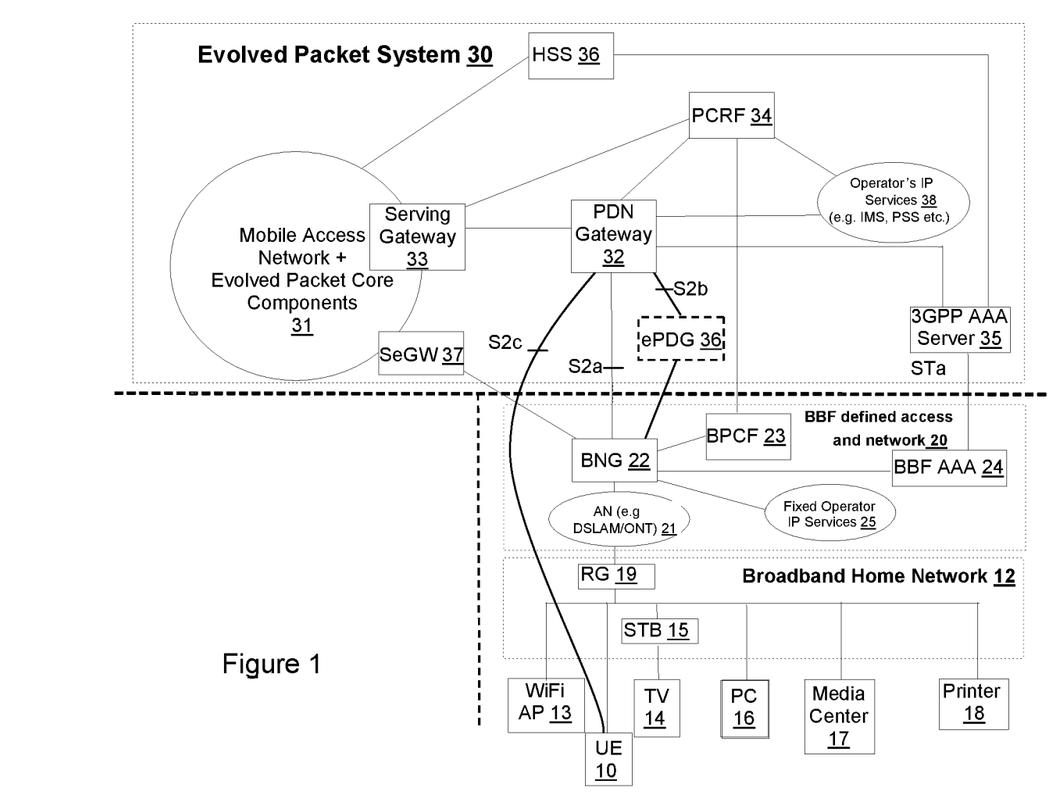
FIG. 1 is a schematic illustration of network entities and paths in the Fixed Mobile Convergence (FMC) specification for enabling broadband users to access PDNs via an EPC network.

The 3GPP and Broadband Forum (BBF) have been developing Fixed Mobile Convergence (FMC), for seamlessly providing LTE services to Broadband Internet users. For this, the 3GPP Release 8 standard defines three ways to connect non-3GPP accesses to the EPC, named as S2a, S2b and S2c after the key interfaces. These are shown in FIG. 1, which illustrates the key entities and network paths involved between a UE 10 and a mobile access network with EPC components 31. As illustrated in FIG. 1 UE 10 connects to a Broadband network, in this example a Broadband Home Network 12, and then via a BBF-defined access network 20 to the Evolved Packet System 30. Also shown are other equipment entities that connect to the Broadband Home Network 12, such as a WiFi AP 13, a TV 14 with set-top box 15, a personal computer 16, a Media centre 17 and a printer 18.

A Residential gateway (RG) 19 in the Broadband Home Network 12 connects to an access node (AN) 21 in the BBF-defined access network 20, which in turn connects to a Border Network Gateway (BNG) 22. Other entities in the BBF-defined access network 20 that connect to the BNG 22 include a Broadband, or BBF, Policy Control Function (BPCF) 23, a BBF Authorisation and Accounting server (BBF AAA) 24 and other fixed operator services 25.

In the Evolved Packet System 30 is a PDN-GW 32, to which user data packets are sent by one of the three methods S2a, S2b, S2c. In addition, the Evolved Packet System 30 includes the mobile access network with EPC components 32, accessed via a Serving Gateway 33, a Policy and Charging Rules Function (PCRF) 34, a 3GPP Authorisation and Accounting server (3GPP AAA) 35, a user's Home Subscriber Server (HSS) 36, a Security Gateway (SeGW) 37 and other entities 38 for the Operator-provided IP services. For some accesses an Evolved Packet Data Gateway (ePDG) may be provided between the PDN-GW 32 and the external gateway node (in this case the BNG 22).

FMC-defined S2c accesses use the Dual-Stack Mobile IPv6 (DSMIPv6) protocol, which sets up a tunnel between the UE 10 and the PDN-GW 32. This is not attractive to many operators for a variety of reasons, including fears that there could be Intellectual Property rights issues regarding use of DSMIPv6.

S2b accesses work by assigning a local IP address to the UE 10 in the BBF network. Then, using this address, the UE 10 connects to the EPC via the ePDG 36 using an IPsec tunnel. For this purpose the UE 10 receives a second IP address, assigned by the EPC. This mode of operation allows the UE 10 to use the second IP address for communication via the EPC to, for example, the service network 38 of the operator (for example, for sending/receiving MMS messages); or as another example to the internet through the operator's firewall and/or online charging systems.

S2a accesses operate without any tunnelling in the UE 10. The BBF network 20 recognizes the UE 10 during authentication and, if the home network of the UE 10 prescribes, the BBF network 20 (specifically the BNG 22) will forward the user's data packet traffic to the EP System 30. The UE 10 sees a native connectivity to the EPC; has only one IP address (provided by the EPC); needs to perform no extra signalling or set up any tunnel; and can send IP packets directly encapsulated in the Wireless Local Area Network (WLAN) frame, which IP packets are routed through the EPC. There are several benefits of S2a, the key one being that no extra features are required in the UE to provide basic EPC connectivity. Simply turning WLAN on in an iPhone, for example, can enable the user to connect to the EPC.

However, for more advanced features, such as mobility between 3G/LTE and WLAN or opening multiple parallel PDN connections, the S2a access method would require some modifications in the UE. A key drawback with S2a is that all PDN accesses, including local nodes or the internet involves routing via the EPC. Since the UE is provided with only a single IP address, it is not possible to control which transport sessions to route through the EPC, or to select between accessing a local network and accessing a PDN via the EPC, as is the case with S2b accesses (and, in fact also with S2c accesses).

One possible solution that has been proposed is to add controls to the S2a access method, which allow the traffic of the UE to be routed either through the EPC (together with assigning an EPC IP address to the UE) or to be routed locally (by assigning a local IP address). However, such controls allow only that either all the UE's traffic is routed via the EPC or all is routed locally. Other proposals have suggested allowing the BNG to decide which traffic flows to route through the EPC and which to route locally. However, this requires a network address translation (NAT) function in the BNG. Also, even if the UE is extended to support multiple PDN connections, in these proposed solutions the routing of each of the PDN connections can only be selected by the network operator, meaning that the UE itself would not be involved and completely unaware which route its traffic was taking. Thus S2a, in spite of its advantages has some drawbacks when compared to the S2b and S2c access methods, where local communication in parallel with communication via the EPC is readily available.

SUMMARY

The idea is to designate an Access Point Name (APN) (the local APN) to be used for local communication. APN is a computer protocol that allows a UE to access the internet using a mobile network. It is a configurable network identifier used by a mobile device when connecting to a GSM carrier. The identifier is then used by the carrier to determine the type of network connection that should be created, including assigning IP addresses to the UE. In particular, the APN identifies a PDN that the UE wants to communicate with. Every time the UE opens a PDN connection to this local APN, it would receive a local IP address and could communicate with local peers using that address.

In one aspect, the invention provides a method of enabling a UE to access a local PDN when the UE accesses an EPC network via a BBF-defined access network over the S2a interface. The method includes receiving a request from the UE in the EPC, the request including one or more Access Point Names, APNs. A decision is made to offload at least one of the APNs by designating it as a local APN. Communications are established between the UE and a PDN identified by use of the designated local APN in a session set-up request from the UE. The communications are established directly via the BBF-defined access network, and so as to avoid passing data packets via the EPC.

A key advantage is that by designating a local APN for local communication, the UE can then communicate with local peers without the communications having to be routed via the EPC. Allowing a UE to use the S2a interface to acquire a local address in a controlled manner, enables communication with local peers or offloading from the EPC, thereby providing S2a accesses with the same capabilities as S2b and S2c accesses.

The method may further comprise receiving the session request from the UE including the designated local APN after the step of making the decision to offload.

The PDN may be a local network of the UE and the local APN may be used by the UE for establishing local communications. The local network may include a broadband home network of the UE.

The designated local APN may be an APN defined in accordance with a predefined standard.

The designated local APN may be provided to the UE by the EPC network. The method may further comprise storing the designated local APN in a memory in the UE for future use. The designated local APN may be provided to the UE prior to the UE attaching to the EPC network via the BBF-defined access network.

The request received from the UE in the EPC may be an access authentication request. The decision to offload may be made at a 3GPP Authentication, Authorisation and Accounting server. The result of the decision may be stored in the BBF access network as part of the UE context. On receiving the session set-up request from the UE in the BBF-defined access network, the UE context may be used to determine, based on the APN used in the set-up request, whether to route a session request via the EPC network or directly to another PDN.

Establishing communications directly between the UE and the PDN comprises allocating a local IP address to the UE.

Another aspect of the invention provides a network entity of an EPC network configured, on receiving an authentication request from a user accessing the EPC network via a BBF-defined access network to designate a local APN, to be used for communications directly with a local PDN so as to avoid passing data packets via the EPC network.

Another aspect of the invention provides a Broadband Network Gateway, BNG, in a BBF-defined access network. The BNG is configured to receive a session set-up request from a user entity, UE, accessing an EPC network via the BBF-defined access network. The BNG is also configured to determine, based on an APN in the set-up request whether the session should be routed via the EPC network, or directly to another PDN so as to avoid passing data packets via the EPC network, and to route the session request accordingly.

The BNG may be further configured, on receiving the session set-up request, to access a UE context stored in the BBF-defined access network. The UE context includes an indication as to the APN to be used for direct communications with local PDNs so as to avoid passing data packets via the EPC network.

Another aspect of the invention provides User Equipment enabled for accessing an EPC network via a BBF-defined access network and configured to use a designated local APN in a set-up request for a communication session with a PDN directly and so as to avoid passing data packets via the EPC network. The User Equipment may be configured to use a predefined standard APN as the designated local APN.

DETAILED DESCRIPTION

Figure 2:
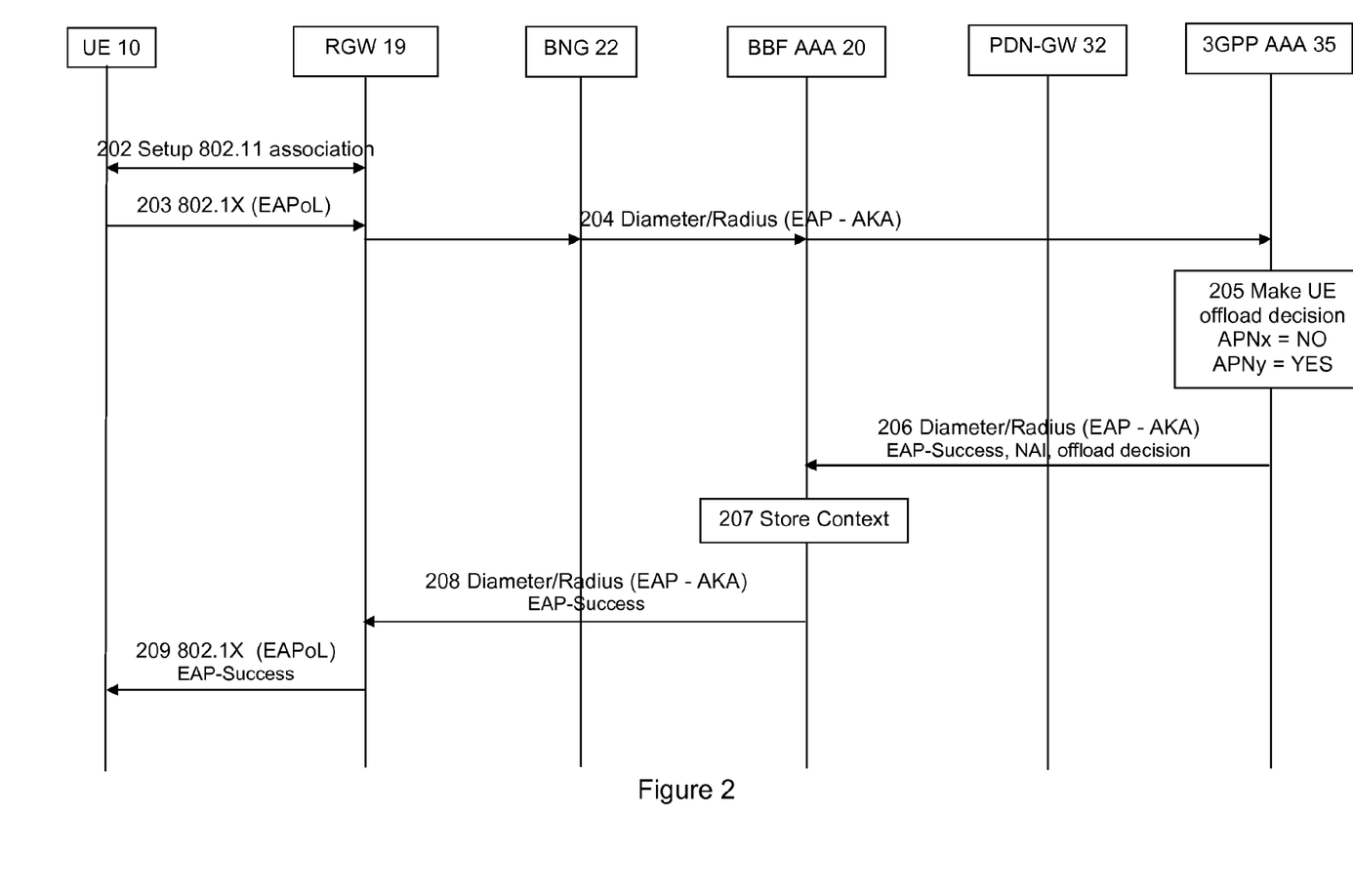
FIG. 2 is a signal diagram illustrating set-up of a UE with APNs to enable it to access PDNs via the EPC or locally.

The signalling diagram of FIG. 2 shows a set-up procedure for designating APNs. The network entities or nodes involved have the same reference numerals as used in FIG. 1. At step 202, the UE 10 commences a local attachment and access authorisation using an on-Line Extensible Authentication Protocol (EAPoL) 802.11 procedure. This includes, at step 203, sending an EAPoL 802.1X signal to the RGW 19. At step 204 the RGW initiates a Diameter/Radius EAP Authentication and Key Agreement (AKA) towards the BBF AAA 24, which forwards this on to the 3GPP AAA 35. Then, at step 205, the 3GPP AAA server 35 makes a decision which APNs to offload, and which to route via EPC. In this particular example, APNx is routed via the EPC, and APNy is off-loaded. Note that the APNs, APNx and APNy, are assumed here to have been pre-provisioned in the UE 10 before the start of the procedure shown. The APNs are selected by the UE 10 and the network has to respond to whatever APN the UE chooses. The UE 10 may be configured to know how the network will handle each APN and to select APNs accordingly. Alternatively, but not shown in FIG. 2, the network may provide the UE 10 with APNs to use. In one embodiment, a standard local APN is defined by an appropriate Standard, and the UE 10 configured to use the standard local APN for any call/sessions to be routed locally.

At step 206, the 3GPP AAA 35 returns a Diameter/Radius signal to the BBF AAA 24 indicating successful authentication and including the offload decision—i.e. which APN (in this case APNx) to use for accessing PDNs via the EPC, and which APNs (in this case APNy) have been off-loaded for local use. At step 207 this information is stored as part of the UE's context in the BBF AAA 24. The successful authentication is then signaled back to the RGW 19 at step 208, and to the UE at step 209. As shown in FIG. 2, the offload decision is stored, and not communicated back to the UE. However, in an alternative scenario the offload decision could be communicated to the UE, and the UE enabled to select the appropriate APN to use in subsequent session requests.

Figure 3:
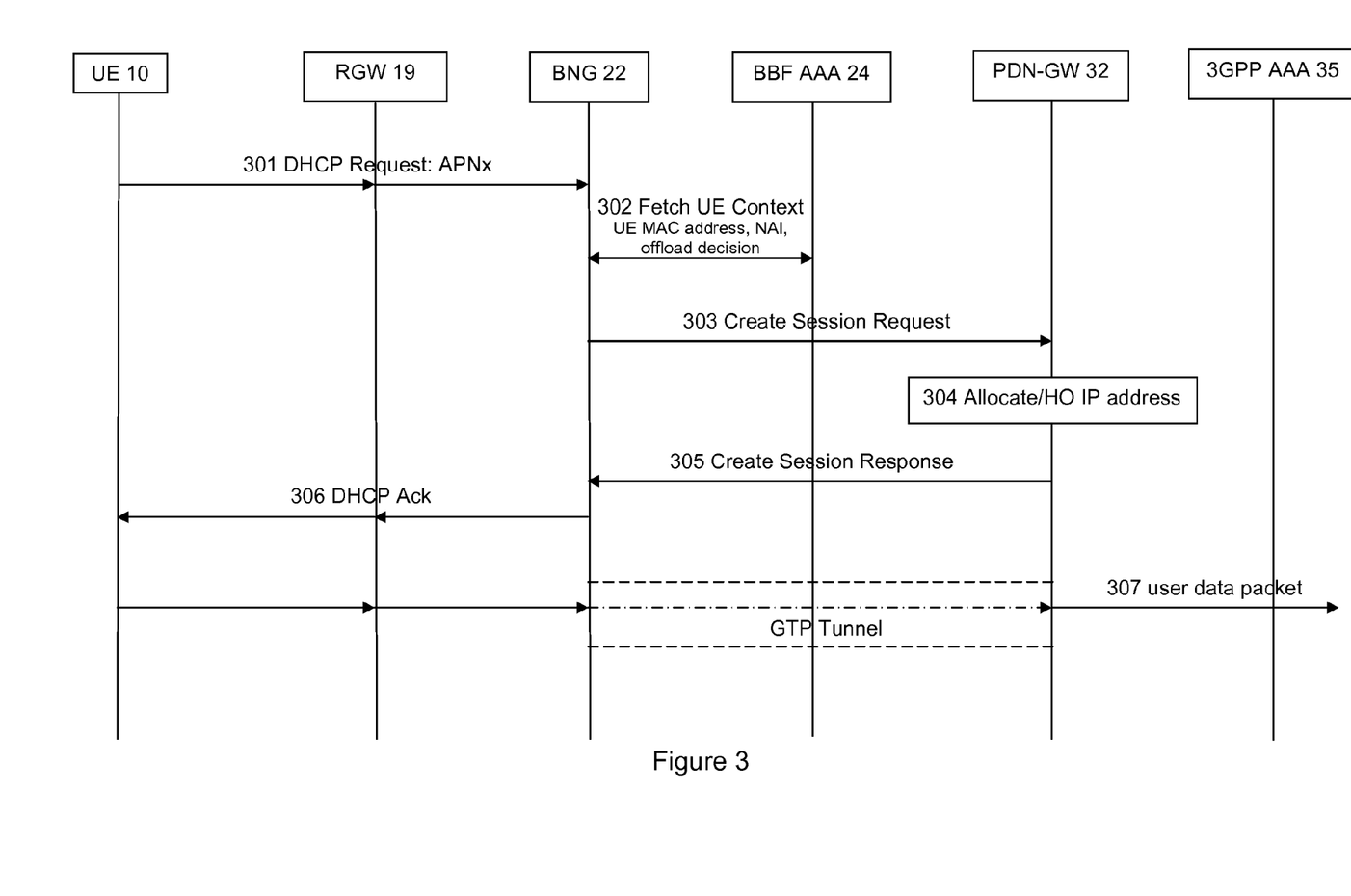
FIG. 3 is a signal diagram illustrating how the UE of FIG. 2 accesses a PDN via the EPC.

The signaling diagram of FIG. 3 shows the process for connecting to a PDN via the EPC following the set-up procedure described above and shown in FIG. 1. Here, at step 301 the UE sends a Dynamic Host Configuration Protocol (DHCP) request to the BNG 22 via the RGW 19 for access to a PDN, as specified by APNx. At step 302, the BNG 22 contacts the BBF AAA 24 to obtain the UE Context together with the other information that was stored (step 207 in FIG. 2), which includes a Media Access Control (MAC) address for the UE and the result of the offload decision. That offload decision specified that for APNx, accesses should be routed via the EPC. Consequently at step 303, the BNG 22 sends a request to create a session to the PDN-GW 32. Thereafter the access is established and the session created in accordance with the normal procedures, by allocating or handing over an IP address, returning a Create Session response (step 305) to the BNG 22, sending a DHCP Acknowledgement back to the UE 10, and establishing a GTP tunnel between the BNG 22 and the PDN-GW 32 for transmitting data packets to/from the UE 10. Handing over an IP address (as opposed to allocating a new IP address) arises when the IP address is already allocated to the UE 10 for another access, in which case the PDN-GW 32 merely changes routing so that the address already allocated to the UE 10 is now routed towards the new access (which event is called a handover).

Figure 4:
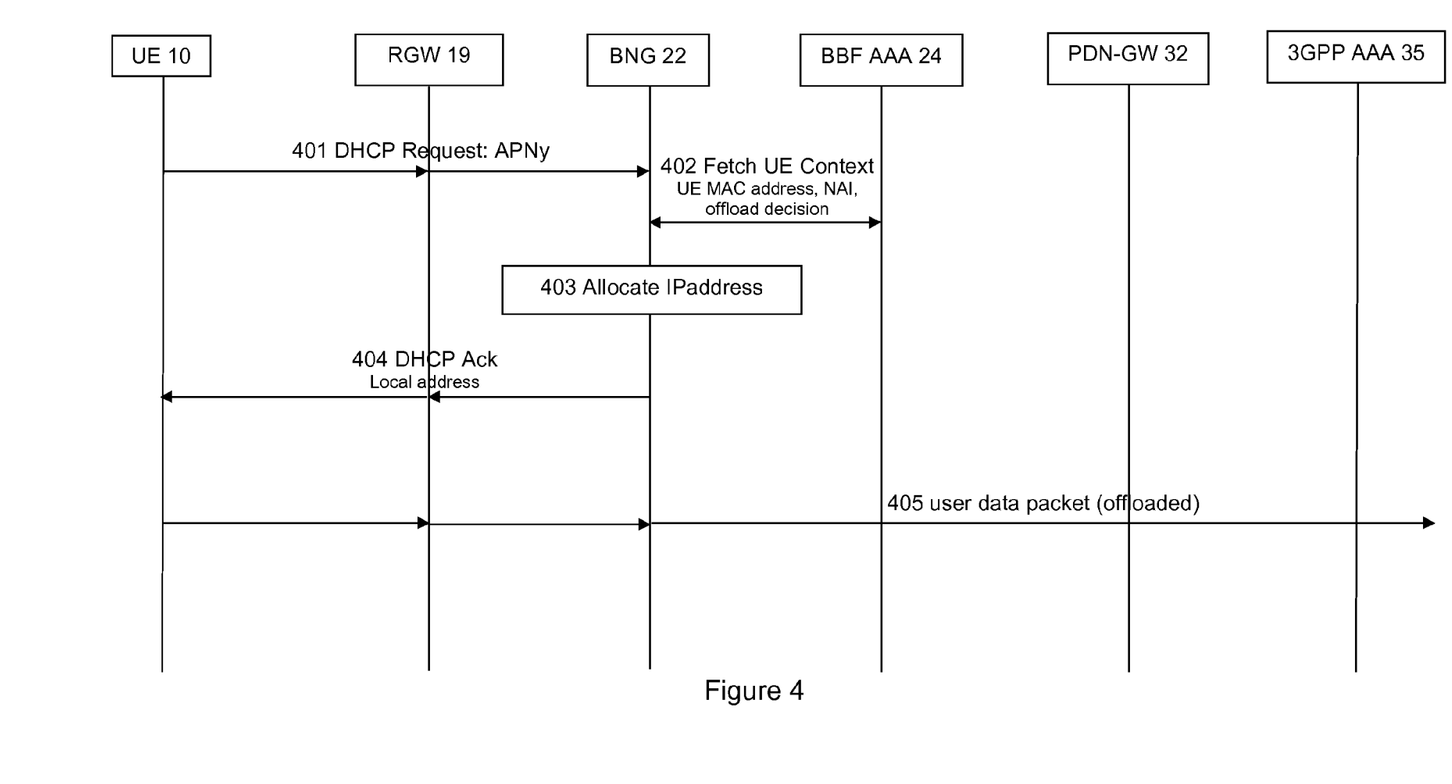
FIG. 4 is a signal diagram illustrating how the UE of FIG. 2 accesses a PDN locally, avoiding the EPC.

The signaling diagram of FIG. 4 shows how an additional PDN Connectivity for the purpose of local access is set up. As above in FIG. 3, at step 401 the UE 10 sends a DHCP request to the BNG 22 via the RGW 19 for access to a PDN, as specified in this case by APNy, and at step 402, the BNG 22 contacts the BBF AAA 24 to obtain the UE Context, which includes the result of the offload decision. That offload decision specified that APNy should be used for local accesses (i.e. for accessing PDNs without routing via the EPC). Consequently at step 303, the BNG 22 allocates a local IP address, and at step 404 returns this to the UE 10 in the DHCP Acknowledgement. Thereafter, the UE 10 can transmit and receive data packets via the local PDN (e.g. the Broadband Home Network 12, as shown in FIG. 1).

In order for it to determine which APN (APNx or APNy) to use, the UE 10 requires some knowledge about which IP flows to route via which PDN connection. This could be configured dynamically within the EPC by an Access Network Discovery and Selection Function (ANDSF). In other words, the ANDSF (or other EPC node) could determine which types of IP flows should be routed via the EPC and which types should be routed locally, and then notify the UE 10 accordingly. Alternatively, the UE 10 could be pre-configured with this information, in which case the local APN might be designated by a well known or standard APN name.

Figure 5:
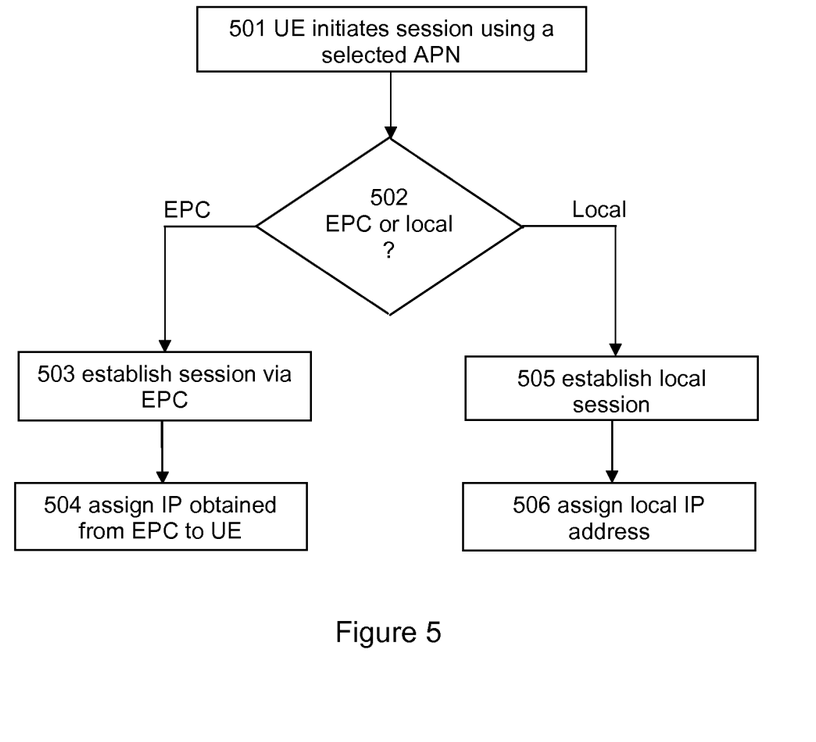
FIG. 5 is a flow diagram illustrating the principal method steps for enabling a UE to access PDNs via the EPC or locally.

FIG. 5 is a flow diagram illustrating the steps used in a method as exemplified by the signalling described above. At step 501 a UE initiates a session using a selected APN. At step 502 a determination is made, based on the APN in the session request, whether the session should be routed via the EPC or offloaded. Note that the decision could be taken in the network based on the UE context information stored there, or the UE could have selected use of a local APN based on information that is pre-configured or dynamically provided to the UE, in the expectation that the session will be routed locally. However, the final decision would be taken in the network, because, for example, it is possible that the network operator might have a good reason to require routing via the EPC even though a local APN has been used by the UE. This way, the network retains control of the decision. In either case the UE will be unaware as to whether the session is being routed via the EPC or locally. If the decision is to route via the EPC, then at step 503 the session is established via the EPC and at step 504 the UE is allocated an appropriate IP address. However, if the decision at step 502 is to route the session locally to a PDN not via the EPC, then at step 505 a local session is established, and at step 506 a local IP address is allocated.

The invention claimed is:

1. A method of enabling a user entity (UE) to access a local packet data network (PDN) when the UE accesses an Evolved Packet Core (EPC) network via a Broadband Forum (BBF) defined access network over the S2a interface, the method comprising:
  receiving, in the EPC, via the BBF defined access network, a request from the UE, the request including one or more Access Point Names (APNs);
  making a decision, in the EPC, to offload at least one of the APNs by designating it as a local APN, in response to the request; and
  establishing communications between the UE and a PDN identified by use of the designated local APN in a session set-up request from the UE, directly via the BBF-defined access network, and so as to avoid passing data packets via the EPC.

2. The method of claim 1, further comprising receiving the session request from the UE including the designated local Access Point Name (APN) after the step of making the decision to offload.

3. The method of claim 1, wherein the PDN is a local network of the UE and the local APN is used by the UE for establishing local communications.

4. The method of claim 3, wherein the local network includes a broadband home network of the UE.

5. The method of claim 1, wherein the designated local APN is an APN defined in accordance with a predefined standard.

6. The method of claim 1, wherein the designated local APN is provided to the UE by the EPC network.

7. The method of claim 6, further comprising storing the designated local APN in a memory in the UE for future use.

8. The method of claim 1, wherein the designated local APN is provided to the UE prior to the UE attaching to the EPC network via the BBF-defined access network.

9. The method of claim 1, wherein the request received from the UE in the EPC is an access authentication request.

10. The method of claim 9, wherein the decision to offload is made at a 3GPP Authentication, Authorisation and Accounting server.

11. The method of claim 9, wherein the result of the decision is stored in the BBF access network as part of the UE context.

12. The method of claim 11, wherein, on receiving the session set-up request from the UE in the BBF access network, the UE context is used to determine, based on the APN used in the set-up request, whether to route a session request via the EPC network or directly to another PDN.

13. The method of claim 1, wherein establishing communications directly between the UE and the PDN comprises allocating a local IP address to the UE.

\* \* \* \* \*